(12) United States Patent
Lam et al.

(10) Patent No.: US 8,953,942 B1
(45) Date of Patent: Feb. 10, 2015

(54) HYBRID WDM-TDM PASSIVE OPTICAL NETWORK

(75) Inventors: Cedric F. Lam, Milpitas, CA (US); Ryohei Urata, Sunnyvale, CA (US); Hong Liu, Palo Alto, CA (US); Yut Loy Chan, San Jose, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 13/458,360

(22) Filed: Apr. 27, 2012

(51) Int. Cl.
*H04J 14/00* (2006.01)
*H04J 14/08* (2006.01)

(52) U.S. Cl.
USPC .................... 398/74; 398/75; 398/68; 398/98

(58) Field of Classification Search
CPC ...................................................... H04J 14/02
See application file for complete search history.

(56) References Cited

U.S. PATENT DOCUMENTS

| | | | |
|---|---|---|---|
| 5,926,298 A | 7/1999 | Li | |
| 7,127,181 B2 * | 10/2006 | Gnauck et al. | 398/159 |
| 7,773,838 B2 | 8/2010 | Lee et al. | |
| 7,860,397 B2 | 12/2010 | Mori et al. | |
| 8,036,529 B2 * | 10/2011 | Kim et al. | 398/47 |
| 8,055,133 B2 * | 11/2011 | Lee et al. | 398/75 |
| 8,238,750 B2 | 8/2012 | Rossetti et al. | |
| 8,320,760 B1 * | 11/2012 | Lam et al. | 398/66 |
| 8,488,977 B2 * | 7/2013 | Kim et al. | 398/175 |
| 8,521,025 B2 * | 8/2013 | Ansari et al. | 398/68 |
| 8,606,100 B2 * | 12/2013 | Kim et al. | 398/5 |
| 2001/0013962 A1 * | 8/2001 | Li | 359/127 |
| 2002/0021462 A1 * | 2/2002 | Delfyett et al. | 359/123 |
| 2002/0126346 A1 * | 9/2002 | Suzuki et al. | 359/123 |
| 2002/0145775 A1 * | 10/2002 | Effenberger et al. | 359/123 |
| 2002/0171888 A1 * | 11/2002 | Melaragni | 359/123 |
| 2004/0202472 A1 * | 10/2004 | Giles et al. | 398/75 |
| 2005/0129404 A1 | 6/2005 | Kim et al. | |
| 2005/0175344 A1 * | 8/2005 | Huang et al. | 398/79 |
| 2006/0239682 A1 * | 10/2006 | Park et al. | 398/71 |
| 2008/0013950 A1 * | 1/2008 | Boudreault et al. | 398/59 |

(Continued)

FOREIGN PATENT DOCUMENTS

EP 2533448 A2 12/2012

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, 2005, 8 pages, JDSU Uniphase Corporation.

(Continued)

*Primary Examiner* — Ken Vanderpuye
*Assistant Examiner* — Amritbir Sandhu
(74) *Attorney, Agent, or Firm* — Honigman Miller Schwartz and Cohn LLP

(57) ABSTRACT

A technique for providing time division multiplexing ("TDM") and wavelength division multiplexing ("WDM") communication services to customer premises ("CP") over a passive optical network ("PON") includes multiplexing a downstream TDM signal with downstream WDM signals onto a fiber trunk line coupled between a central office and a remote node ("RN"), separating the downstream WDM signals from the downstream TDM signal at the RN with a wavelength selective filter, power splitting the downstream TDM signal at the RN onto a plurality of fiber access lines as split TDM signals; and recombining each of the WDM signals with a corresponding one of the split TDM signals onto a corresponding one of the fiber access lines.

19 Claims, 7 Drawing Sheets

(56) References Cited

U.S. PATENT DOCUMENTS

| | | | | |
|---|---|---|---|---|
| 2008/0131129 | A1* | 6/2008 | Bouda | 398/82 |
| 2008/0138073 | A1* | 6/2008 | Kim et al. | 398/79 |
| 2009/0220230 | A1* | 9/2009 | Kim et al. | 398/72 |
| 2010/0021171 | A1* | 1/2010 | Wang et al. | 398/82 |
| 2010/0054740 | A1* | 3/2010 | Lee et al. | 398/68 |
| 2010/0189442 | A1* | 7/2010 | Grobe | 398/79 |
| 2011/0222855 | A1* | 9/2011 | Kim et al. | 398/79 |
| 2011/0229140 | A1 | 9/2011 | Ohlen et al. | |
| 2011/0268438 | A1* | 11/2011 | Daems | 398/16 |
| 2012/0177371 | A1* | 7/2012 | Lee et al. | 398/63 |
| 2012/0230693 | A1* | 9/2012 | Zou | 398/66 |
| 2012/0237216 | A1* | 9/2012 | Zhang et al. | 398/45 |
| 2012/0269515 | A1* | 10/2012 | Cvijetic et al. | 398/72 |
| 2012/0315047 | A1* | 12/2012 | Iannone et al. | 398/72 |
| 2013/0039656 | A1* | 2/2013 | Lam et al. | 398/47 |
| 2013/0170834 | A1* | 7/2013 | Cho et al. | 398/58 |
| 2013/0183039 | A1* | 7/2013 | Hood et al. | 398/72 |
| 2013/0188951 | A1* | 7/2013 | Zheng et al. | 398/58 |
| 2013/0209105 | A1* | 8/2013 | Jeong et al. | 398/72 |
| 2013/0223841 | A1* | 8/2013 | Lee | 398/72 |

OTHER PUBLICATIONS

NetCracker, "Comprehensive Telecom Operations and Management Solutions, Product Overview", 2010, 2 pages, NetCracker Technology Corp.

"ONMS PON Centralized Remote PON Test System", <http://www.jdsu.com/product-literature/onmspon_br_fop_tm_ae.pdf>, Jun. 2009, 4 pages, JDSU Uniphase Corporation.

"Homodyne detection", From Wikipedia, the free encyclopedia, <http://en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Optical_heterodyne_detection> retrieved from Internet on Jul. 11, 2011, 5 pages.

Lam, Cedric F. et al., "Installation of Fiber-To-The-Premise Using Optical Demarcation Devices", U.S. Appl. No. 12/941,766, filed Nov. 8, 2010.

Lam, Cedric F. et al., "Fiber Diagnosis System for Point-To-Point Optical Access Networks", U.S. Appl. No. 12/985,041, filed Jan. 5, 2011.

Lam, Cedric F. et al., "Detection of Fiber Faults in Optical Fiber Networks", U.S. Appl. No. 13/040,983, filed Mar. 4, 2011.

Lam, Cedric F., "Migratable Wavelength Division Multiplexing Passive Optical Network", U.S. Appl. No. 13/205,055, filed Aug. 8, 2011.

Lam, Cedric F. et al., "Passive Optical Network With Asymmetric Modulation Scheme", U.S. Appl. No. 13/288,555, filed Nov. 3, 2011.

Lam, Cedric F. et al., "Fiber Diagnosis System for WDM Optical Access Networks", U.S. Appl. No. 13/355,233, filed Jan. 20, 2012.

* cited by examiner

HYBRID WDM-TDM PASSIVE OPTICAL NETWORK

TECHNICAL FIELD

This disclosure relates generally to optical networks, and in particular but not exclusively, relates to wavelength division multiplexing ("WDM") optical access networks and time division multiplexing ("TDM") access networks.

BACKGROUND INFORMATION

Fiber-to-the-home (FTTH) has been regarded as the ultimate form of broadband access offering very high bandwidth to end-users. Today's FTTH systems are mostly offered through point-to-multipoint time division multiplexed (TDM) passive optical networks (PONs) using a 1:N power splitter (e.g., Ethernet-PON, Gigabit-PON, and 10G versions of these systems) at a remote node (RN) in the field to share a common transceiver at the central office (CO), or through point-to-point (pt-2-pt) optical Ethernets with individual home-run fibers.

The upstream and downstream signals of a TDM-PON are transmitted using different optical wavelengths (usually 1310 nm for upstream transmission and 1490 nm for downstream transmission). The TDM-PON media access controller (MAC) within the CO schedules the transmission between the CO transceiver (TRX) and the end users by assigning appropriate time slots to each end user. A TDM-PON provides beneficial savings in the number of trunk fibers (between RN and CO) and optical transceiver counts at the CO while saving patch panel space to terminate fibers, but does not scale well with bandwidth growth. The bandwidth per household is often oversubscribed as the bandwidth per optical line terminal (OLT) TRX at the CO is shared among all optical network units (ONUs) connected to the given OLT TRX. To support Gb/s per user transmission speeds on a TDM-PON can require >10 Gb/s transceivers at each ONU. Thus, high-speed transmissions can be both technologically challenging and expensive.

Pt-2-pt optical networks provide very high bandwidths to end users, but do not scale well with optical fiber termination at the CO and fiber counts. Rather, pt-2-pt optical networks result in large numbers of trunk lines and transceivers and fiber terminations in the CO. This usually results in greater space requirements, higher power, and increased capital expenses.

A wavelength division multiplexed (WDM) PON is another approach, which provides the benefit of fiber consolidation and pt-2-pt virtual links to end-users by assigning separate wavelengths between the CO and individual users. It can offer the benefits of both pt-2-multipoint TDM-PON and pt-2-pt architectures. Traditional WDM-PON systems use a wavelength demultiplexer (as opposed to the power splitter used in TDM-PON) at the RN in the field to distribute a separate wavelength to end-users. To upgrade a conventional TDM-PON to a WDM-PON currently involves replacing the power splitter in the RN with the wavelength multiplexer and replacing all TDM-ONUs at user premises with WDM-ONUs. This all or nothing upgrade is a sort of fork-lifting upgrade that is not only cumbersome and expensive but also disruptive to current subscribers and difficult to coordinate.

Despite its promise, WDM-PON technologies are still maturing and have not yet achieved mainstream adoption. As such, it is important to have a migration strategy to upgrade TDM-PON to WDM-PON systems seamlessly with minimum disruption to the existing TDM-PON users. Such a system should support coexistence of TDM-PON and WDM-PON architectures during the migration period.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Implementations of a system and technique for implementing a hybrid passive optical network ("PON") that multiplexes wavelength division multiplexing ("WDM") signals and time division multiplexing ("TDM") signals over a single fiber plant infrastructure are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Fiber-to-the-home ("FTTH") is a broadband access network infrastructure. One option for implementing an FTTH access network uses a point-to-multipoint passive optical network ("PON") architecture. A point-to-multipoint PON optical network uses unpowered or passive optical splitters/multiplexers to enable one or two fibers to serve multiple customer premises ("CPs") (e.g., 32 to 128 customer premises). Another option for FTTH is to string a separate homerun fiber from a carrier central office ("CO") all the way to each CP. Such architecture is called a point-2-point architecture (pt-2-pt) as opposed to point-to-multipoint architecture.

Figure 1A:
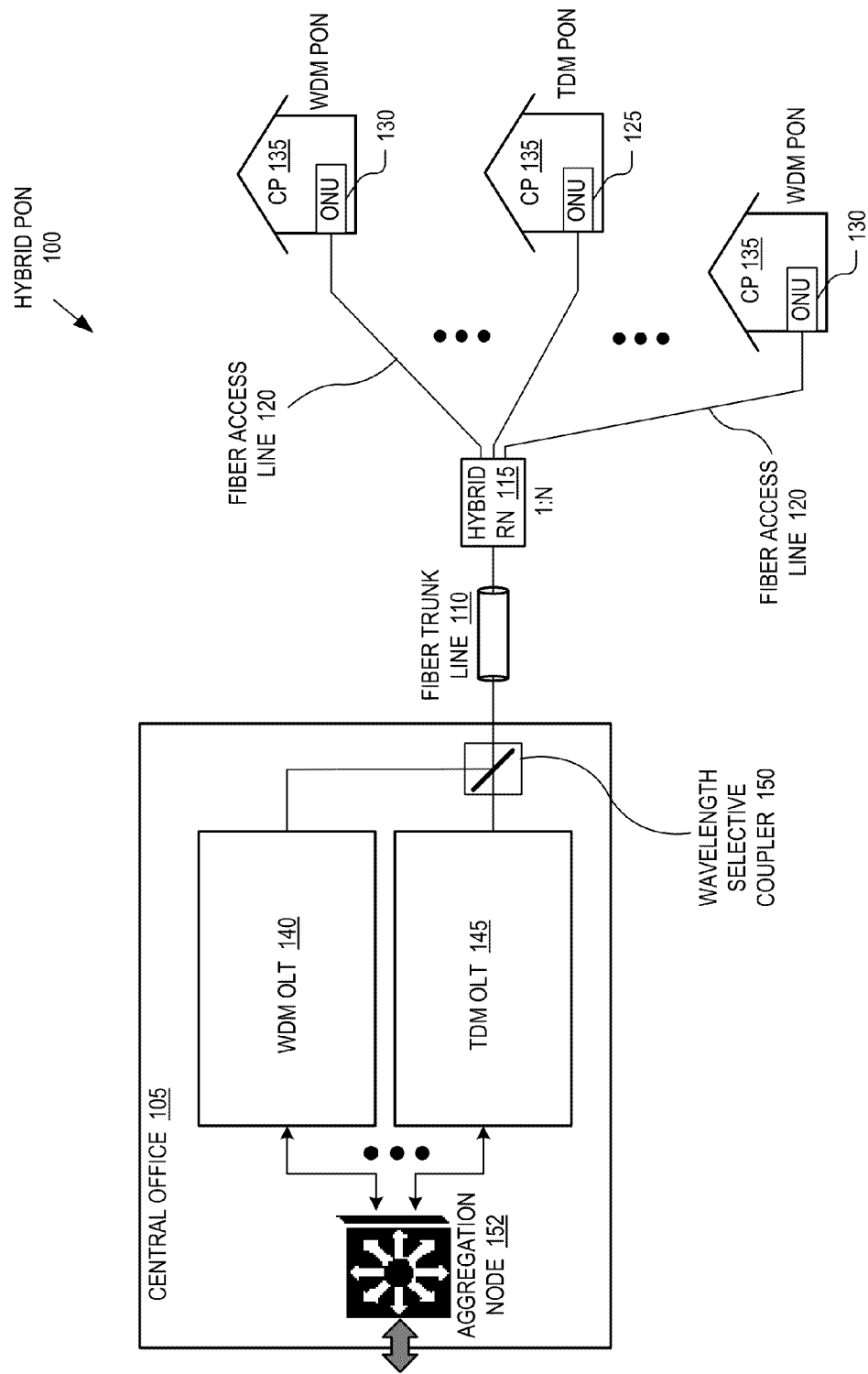
FIG. 1A is a functional block diagram illustrating a hybrid passive optical network ("PON"), in accordance with an implementation of the disclosure.

FTTH deployment is so capital intensive that many broadband access infrastructure providers are feverishly looking for methods to lower the deployment cost and migration from existing PON technologies (e.g., TDM-PON) to more advanced PON technologies (e.g., WDM-PON). FIG. 1A is a functional block diagram illustrating a hybrid PON 100 capable of facilitating a seamless migration from an existing TDM-PON access network infrastructure to a WDM-PON access network infrastructure, in accordance with an implementation of the disclosure. Hybrid PON 100 is capable of concurrently servicing TDM optical network units ("ONUs") and WDM ONUs over a single fiber trunk line and a hybrid remote node ("RN"). Hybrid PON 100 facilitates a virtually seamless transition from TDM-PON architecture to WDM PON architecture. Existing TDM CPs can continue to operate using their existing customer premise equipment (e.g., TDM ONUs), while new CPs can be added and given advanced WDM ONUs. The two technologies can be operated concurrently within hybrid PON 100 indefinitely or until such time as the conventional TDM ONUs are swapped out in a controlled and organized manner that limits disruptions to existing end-users and provides timing flexibility.

Figure 1B:
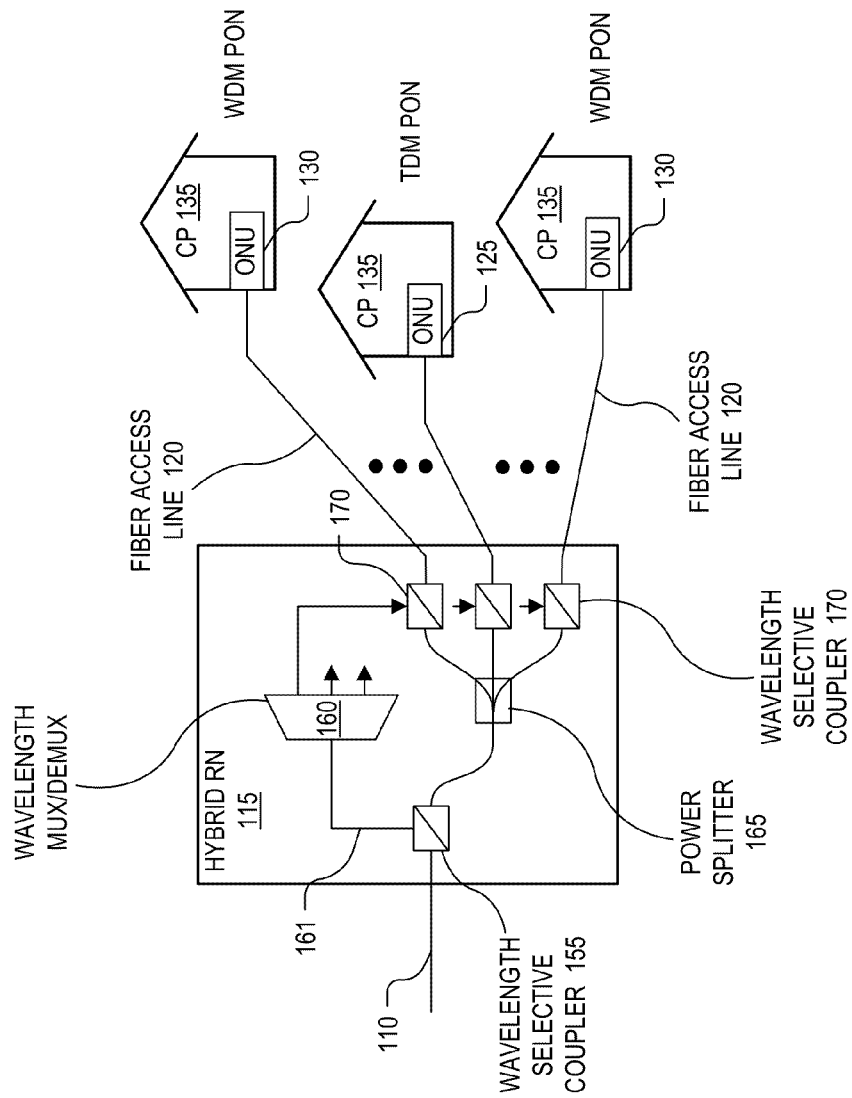
FIG. 1B is a functional block diagram illustrating internal components of a remote node of the hybrid PON, in accordance with an implementation of the disclosure.

The illustrated implementation of hybrid PON 100 includes a CO 105, a fiber trunk line 110, a hybrid RN 115, fiber access lines 120, TDM ONUs 125 and WDM ONUs 130 at CPs 135. The illustrated implementation of CO 105 includes a WDM optical line terminal ("OLT") 140, a TDM OLT 145, a wavelength selective coupler 150, and an aggregation node 152. FIG. 1B illustrates internal details of hybrid RN 115. The illustrated implementation of hybrid RN 115 includes a wavelength selective coupler 155, a wavelength multiplexer/demultiplexer ("MUX/DEMUX") 160, a power splitter 165, and wavelength selective couplers 170.

Fiber trunk line 110, hybrid RN 115, and fiber access lines 120 that couple to WDM ONUs 130 may be considered to make up a WDM PON or WDM sub-PON, while the fiber trunk line 115, hybrid RN 115, and fiber access lines 120 that coupled to TDM ONUs 125 may be considered to make up a TDM PON or TDM sub-PON, and collectively fiber trunk line 110, hybrid RN 115 and all fiber access lines 120 may be referred to as a hybrid PON. WDM OLT 140 and TDM OLT 145 serve as the service provider's endpoint at CO 105 for their respect sub-PONs. Each OLT serves two primary functions: 1) performing optical-to-electrical and electrical-to-optical conversions between the service provider's equipment and their respective sub-PON and 2) coordinating multiplexing with the ONUs at the other end of their respective sub-PONs. Of course, WDM OLT 140 performs wavelength division multiplexing between ONUs 130 and TDM OLT 145 performs time division multiplexing between ONUs 125. Each WDM OLT 140 and TDM OLT 145 may service a number of CPs 135 (e.g., 32, 64, 128, etc.) while a single CO 105 may services thousands of CPs 135 (e.g., 50,000). Thus, while FIG. 1A illustrates CO 105 as including just one WMD OLT 140 and one TDM OLT 145, in practice, CO 105 may include multiple WDM OLTs 140 and multiple TDM OLTs 145 with their respective media access controllers multiplexed via aggregation node 152.

Fiber trunk line 110 extends from CO 105 to hybrid RN 115 located within a neighborhood of CPs 135, which represent potential or existing customers of the service provider. From hybrid RN 115, individual fiber access lines 120 extend to corresponding CPs 135. Fiber access lines 120 may be terminated at demarcation points. The demarcation point may be located on a side of the CP where the fiber access line enters the building or in an access box or hand hole near the customers property line (e.g., in a utility right-of-way). Demarcation points provide a well-defined demarcation identification point between the customer premise equipment ("CPE") including TDM ONU 125 and/or WDM 130 and the carrier's fiber plant. Demarcation points may serve to demark the terminal point of maintenance responsibility for the carrier. Both fiber trunk line 110 and fiber access lines 120 may run along a utility right-of-way running adjacent to a neighborhood street. Fiber trunk line 110 and fiber access lines 120 may be a subterranean fiber plant, a suspended fiber plant (e.g., suspended along telephone poles), a combination thereof, or otherwise.

ONUs 125 and 130 serve as the CPE endpoint at CPs 135 and perform the primary function of performing optical-to-electrical and electrical-to-optical conversions. ONUs 130 and 125 link to a set of WDM OLT 140 and TDM OLT 145, respectively, at CO 105 via a single hybrid RN 115, fiber trunk line 110 and wavelength selective coupler 150. Downstream (signals propagating along the optical direction extending from CO to CP) TDM signals received at hybrid RN 115 are broadcast on all downstream ports (ports optically facing CPs) of hybrid RN 115. Downstream WDM signals received at hybrid RN 115 are de-multiplexed by hybrid RN 115 and selectively routed to the appropriate CP 135. All upstream signals (signals propagating along the optical direction extending from CP to CO) received from either TDM ONUs 125 or WDM ONUs 130 are combined by hybrid RN 115 onto a single upstream port (port optically facing the CO) for delivery to CO 105 via fiber trunk line 110. At CO 105, wavelength selective coupler 150 separates the upstream TMD signal from the upstream WDM signals for routing to TDM OLT 145 and WDM OLT 140, respectively. As discussed in further detail below, although the downstream TDM signals are broadcast on all fiber access lines 120, WDM ONUs 130 each include a filter to block the TDM signals and pass the WDM signals.

In one embodiment, WDM ONUs 130 are colorless or wavelength agnostic transceivers. For example, the receiver circuitry in each WDM ONU 130 may include a broadband receiver capable of receiving any of the WDM wavelengths and instead relies upon the de-multiplexing of the downstream WDM signals at hybrid RN 115 for wavelength selectivity. Correspondingly, WDM ONUs 130 may include a tunable laser source for generating the carrier wavelength for the upstream WDM signals, which is tunable to any of the wavelengths available in the transmission grid of upstream WDM communications. These colorless WDM ONUs 130 mean that each device is generic and configurable at deployment time for each user and avoids the need for unique, per user, tunable filters on each fiber access line 120 linked to a different WDM ONU 125. Rather, WDM ONUs 130 may include an inexpensive common filter (e.g., a multi-layer thin film band pass filter) that simply blocks the TDM wavelengths.

During operation, the downstream TDM signal is combined with the downstream WDM signals onto fiber trunk line 110 using wavelength selective coupler 150. Wavelength selective coupler 150 may be implemented as a coarse wavelength division multiplexer (e.g., thin film reflective filter, wavelength selective evanescent coupler, etc.). Wavelength selective coupler 150 operates to pass substantially all optical power of the WDM signals to/from WDM OLT 140 while substantially passing all optical power of the TDM signals to/from TDM OLT 145. Since a broadband beam splitter is not used, the optical coupling is substantially less lossy. The improved coupling efficiency relaxes the sensitivity requirements for the receive circuitry within the OLTs and ONUs.

Returning to FIG. 1B, hybrid RN 115 uses a hybid AWG/power splitter structure. In the downstream direction, hybrid RN 115 operates to separate the WDM signals from the TDM signal, power split the TDM signal onto each fiber access line 120, de-multiplex the WDM signals, and re-combine the de-multiplexed WDM signals with the power split TDM signal onto each fiber access line 120. In the upstream direction, hybrid RN 115 operates to separate the TDM signal received on a given fiber access line 120 from its corresponding WDM signal, couple the upstream TDM signal through the power splitter 165 to wavelength selective coupler 155, multiplex the WDM signals onto a single fiber link 161, and recombine the TDM signal with the multiplexed WDM signals onto fiber trunk line 110.

Wavelength MUX/DEMUX 160 may be implemented as a cyclic arrayed waveguide grating ("AWG") having a free spectral range ("FSR"). The sub-components of hybrid RN 115 may be discrete components assembled into a single module or onto a common substrate or integrated components combined into one or more passive planar lightwave circuits ("PLC"). Wavelength selective couplers 155 and 170 may be implemented using the same or similar optical coupler as wavelength selective coupler 150.

Figure 2:
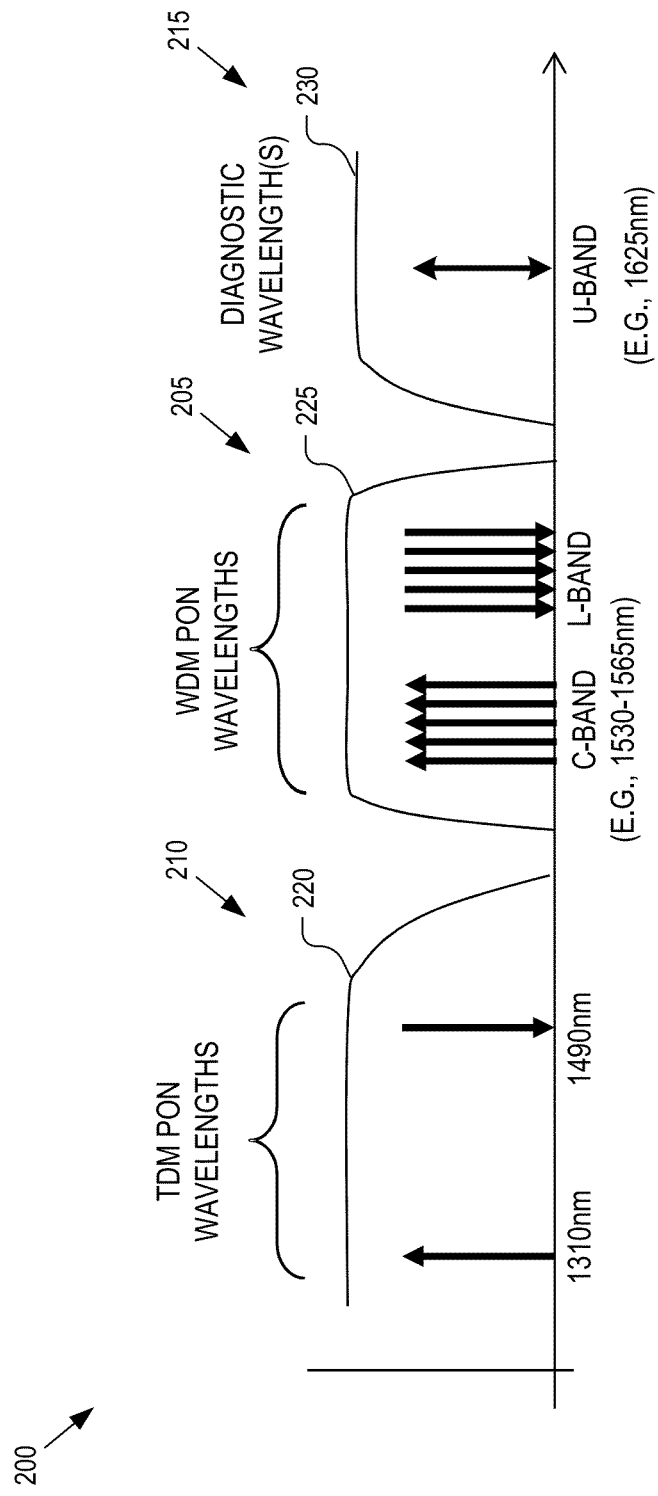
FIG. 2 is a chart illustrating communication and diagnostic wavelengths of a hybrid PON, in accordance with an implementation of the disclosure.

FIG. 2 is a chart 200 illustrating an example wavelength allocation or wavelength grid for the WDM signals, the TDM signals, and in some implementations, a test diagnostic signal. It should be appreciated that FIG. 2 is merely demonstrative and other schemes of wavelength or band allocations may be allocated to the WDM, TDM, and diagnostic signals. The WDM signals may be allocated according to a WDM-PON wavelength grid 205, which uses L-band for downstream and C-band for upstream transmissions. The TDM signals may be allocated according to a TDM-PON wavelength grid 210, which includes just two wavelengths—an upstream wavelength and a downstream wavelength. The diagnostic signal (s) may be allocated according to a diagnostic wavelength grid 215, which in the illustrated embodiment includes just a single wavelength (in other embodiments diagnostic wavelength grid 215 may include multiple wavelengths).

The WDM-PON wavelength grid 205 includes many upstream and downstream wavelengths (e.g., 32 upstream wavelengths and 32 downstream wavelengths having a 100 GHz wavelength spacing in C-band and L-band, respectively, as illustrated here). In one embodiment, the upstream and the downstream WDM signals allocated for use by a given WDM ONU 130 are separated by a nonzero multiple integer of the FSR of wavelength MUX/DEMUX 160. Implementing MUX/DEMUX 160 using a cyclical AWG enables upstream and downstream WDM signals to share the same fiber using wavelengths that occupy different FSRs. The upstream and downstream wavelengths are separated to prevent the back-reflected upstream signal from interfering with the downstream transmitted signal from WDM OLT 140. Additionally, separating the upstream and downstream WDM signals assigned to a given ONU 130 by at least a one FSR of wavelength MUX/DEMUX 160 (see FIG. 6), relaxes the design requirements for optical diplexer 610, since it need not be design to separate spectrally adjacent wavelengths. This can reduce the costs and size of optical diplexer 610. For example, optical diplexer 610 may be implemented as a coarse wavelength filter such as a multi-layer thin film reflective structure similar to couplers 170. In this embodiment, either downstream wavelengths are reflected and upstream wavelengths pass through the thin film reflective structure, or vice versa.

Chart 200 further illustrates a single diagnostic wavelength (e.g., 1625 nm) for carrying a diagnostic test signal (e.g., optical time domain reflectometry diagnostic signal). The diagnostic wavelength is used for both the downstream and upstream directions, since the upstream diagnostic signal consists of reflections of the downstream diagnostic signal.

In one implementation, lines 220, 225, and 230 represent filter functions implemented by the various wavelength selective couplers disclosed therein. In the illustrated implementation, line 220 is a low pass filter function, line 225 is a band pass filter function, and line 230 is a high pass filter function. Of course, generically, all three lines 220, 225, and 230 may be referred to as band pass filter functions.

Figures 3A, 3B:
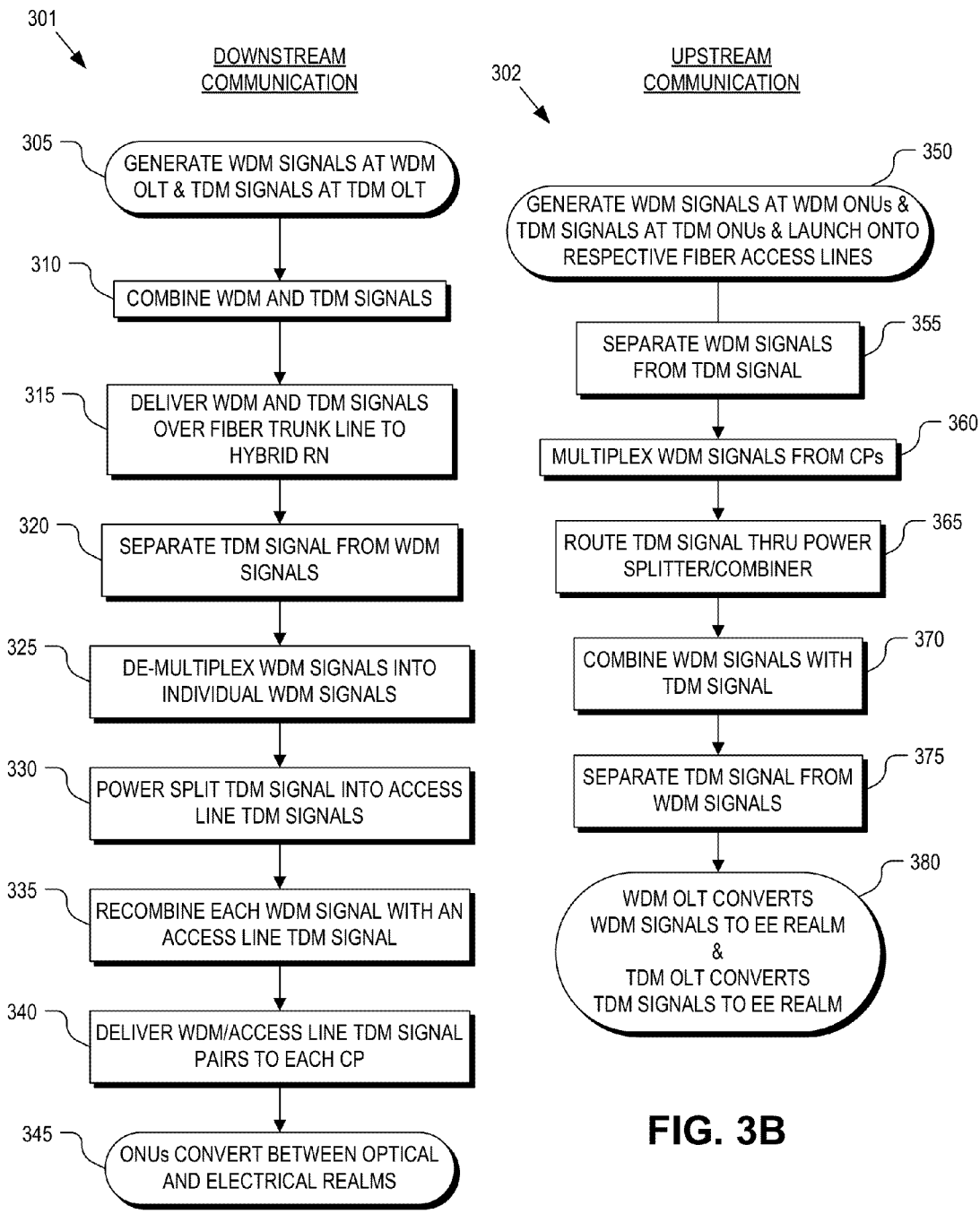
FIGS. 3A & 3B are flow charts illustrating a process of operating a hybrid PON including TDM and WDM sub-PONs sharing a common fiber trunk line and remote node, in accordance with an implementation of the disclosure.

FIGS. 3A & 3B are flow charts illustrating processes of operation of hybrid PON 100, in accordance with an implementation of the disclosure. FIG. 3A illustrates a process 301 for downstream flowing communications, while FIG. 3B illustrates a process 302 for upstream flowing communications. The order in which some or all of the process blocks appear in process 301 or 302 should not be deemed limiting. Rather, one of ordinary skill in the art having the benefit of the present disclosure will understand that some of the process blocks may be executed in a variety of orders not illustrated, or even in parallel.

In a process block 305, each OLT within CO 105 receives electrical signals from their respective MACs and generates optical signals for launching into their respect sub-PONs. For example, WDM OLT 140 generates WDM signals (discussed in greater detail below in connection with FIG. 4) while TDM OLT 145 generates TDM signals. In a process block 310, the TDM signal is combined with the WDM signals using wavelength selective coupler 150 and delivered to hybrid RN 115 via fiber trunk line 110 (process block 315). Wavelength selective coupler 150 may be implemented as a coarse wavelength division multiplexer (e.g., thin film reflective filter, wavelength selective evanescent coupler, etc.) that substantially directs all optical power of the WDM signals to/from OLT 140 while substantially directing all optical power of the TDM signals to/from OLT 145.

In a process block 320, the WDM signals and the TDM signal are separated at hybrid RN 115 using wavelength selective coupler 155. The WDM signals are directed to wavelength MUX/DEMUX 160 and routed to individual downstream ports of wavelength MUX/DEMUX 160 (process block 325) while the TDM signal is directed to power splitter 165. In process block 330, power splitter 165 splits the optical power of the TDM signal across the fiber access lines 120 as individual access line TDM signals. In one implementation, the power split ratio is substantially equal across all fiber access lines 120. The individual downstream WDM signals (each having a different wavelength) are output on a separate downstream port of wavelength MUX/DEMUX 160. Each downstream port is optically coupled to a corresponding wavelength selective coupler 170. In a process block 335, each downstream WDM signal is recombined with an access line TDM signal on a given fiber access lines 120. The separately combined downstream WDM signal and access lines TDM signal pairs are then delivered to each CP 135 via fiber access lines 120. In process block 345, TDM ONUs 125 time share the TDM signal and convert them into the electrical realm, while the WDM ONUs 130 filter out the TDM signals and convert the WDM signals to the electrical realm.

Upstream communications are now described in connection with process 302 (FIG. 3B). In a process block 350, each individual CP 135 generates upstream data signals. WDM ONUs 130 are capable of outputting upstream optical signals on the particular wavelength allocated to the user's upstream traffic, as allocated from the WDM-PON wavelength grid 205 (WDM ONU operation is discussed in greater detail below in connection with FIG. 6). For CPs 135 having a TDM ONU 125, the upstream data signals are converted to the optical realm, and signals from different TDM ONUs 125 are time multiplexed (scheduled) onto the upstream TDM wavelength. The optical upstream TDM and WDM signals are launched into access lines 120.

The upstream TDM signal and upstream WDM signals reach hybrid RN 115 along respective fiber access lines 120. In a process block 355, wavelength selective couplers 170 separate the upstream WDM signals from the TDM signal. The upstream WDM signals from each fiber access line 120 are multiplexed (or combined) by wavelength MUX/DEMUX 160 onto the single optical link 161 (process block 360). The upstream TDM signal is passed through power splitter 165 to wavelength selective coupler 155 (process block 365). Of course, only a single upstream TDM signal is routed at a given time. The multiplexed WDM signals and TDM signal are then combined by wavelength selective coupler 155 onto fiber trunk line 110 (process block 370) and delivered to CO 105.

Upon reaching CO 105, the TDM signal is separated from the multiplexed WDM signals by wavelength selective couplers 150 (process block 375). The TDM signal is directed into TDM OLT 145, while the multiplexed WDM signals are directed to WDM OLT 140 for decoding and conversion back into the electrical realm (process block 380).

Figure 4:
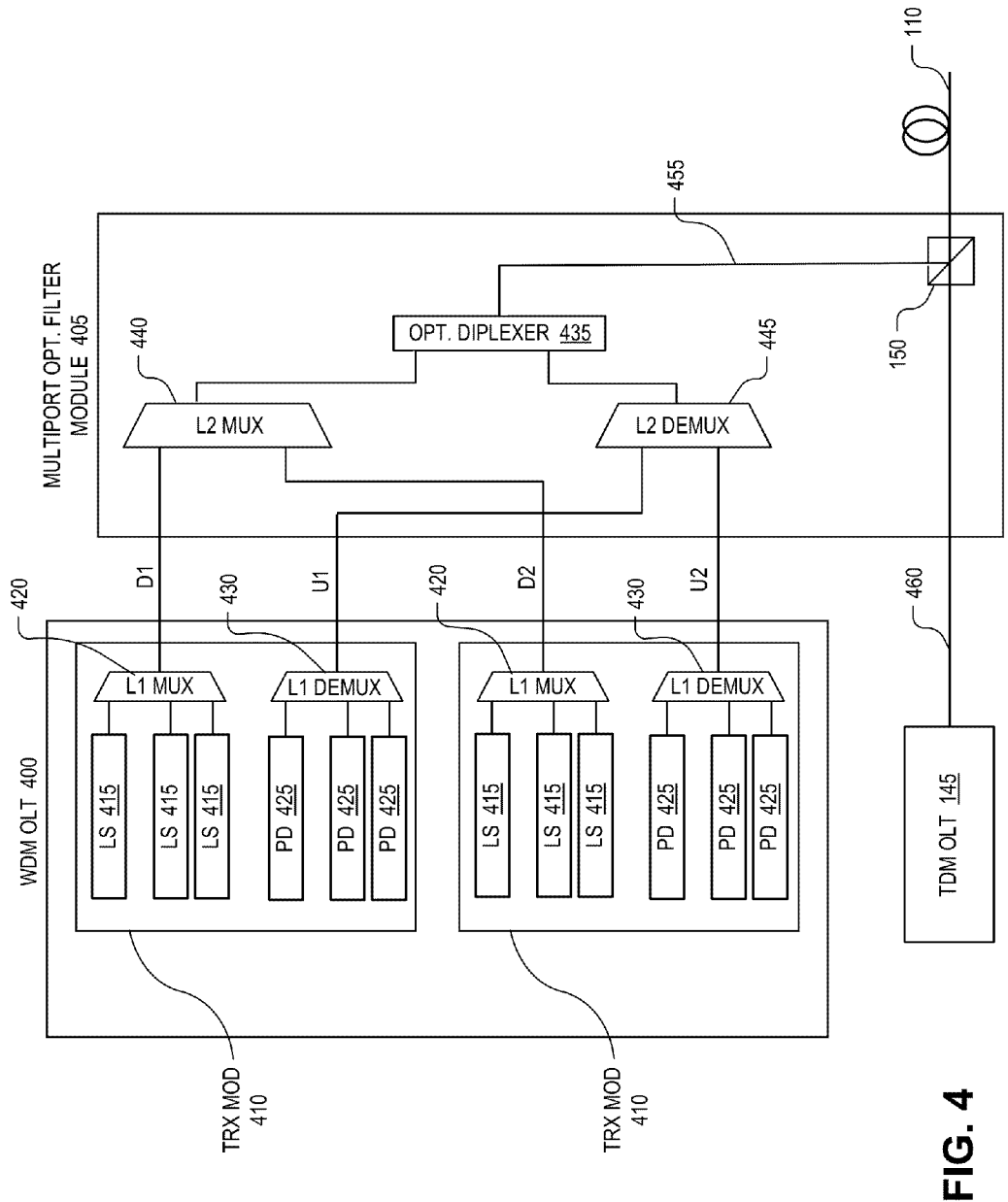
FIG. 4 is a functional block diagram illustrating internal components of a WDM OLT and multi-port optical filter module located at the central office of the hybrid PON, in accordance with implementations of the disclosure.

FIG. 4 is a functional block diagram illustrating internal components of a WDM OLT 400 and a multi-port optical filter module 405 located at a CO of a hybrid PON, in accordance with an implementation of the disclosure. WDM OLT 400 is one possible implementation of WDM OLT 140 illustrated in FIG. 1A, while multi-port optical filter module 405 may replace wavelength selective coupler 150. The illustrated embodiment of WDM OLT 400 includes one or more transceiver modules 410 (two are illustrated as an example). The illustrated implementation of each transceiver module 410 includes a transmitter array of laser sources 415, an optical level-1 ("L1") MUX 420, a receiver array of photo-detectors 425, and an optical L1 DEMUX 430. The illustrated embodiment of multi-port optical filter module 405 includes an optical diplexer 435, an L2 MUX 440, an L2 DEMUX 445, and a wavelength selective coupler 150.

Collectively, L1 MUXs 420, L2 MUX 440, and optical diplexer 435 are coupled to optically multiplex the downstream WDM signals generated by laser sources 415 onto a single optical link 455. Correspondingly, optical diplexer 435, L2 DEMUX 445, and L1 DEMUXs 430 are coupled to optically demultiplex the upstream WDM signals received on optical link 455 to their designated photo-detectors 425. Wavelength selective coupler 150 combines the downstream WDM and TDM signals onto fiber trunk line 110 and separates upstream WDM and TDM signals onto optical links 455 and 460, respectively.

Optical diplexer 435 may be implemented using a 3-dB power splitter, a three port optical circulator, a 2:1 interleaver, a band filter that separates upstream and downstream signals, or otherwise. Wavelength selective coupler 150 may be implemented using a multi-layer thin film filter, an evanescent coupler, or otherwise. Laser sources 415 may be implemented using laser diodes each tuned to a different wavelength and external modulators (e.g., phase modulator, amplitude modulator, combination phase and amplitude modulators, etc.). In another embodiment, laser sources 415 may be directly modulated to reduce costs. Photo-detectors 415 may include photo-diodes (e.g., PIN or avalanche photo-diodes) coupled to trans-impedance amplifiers ("TIAs").

Figure 5:
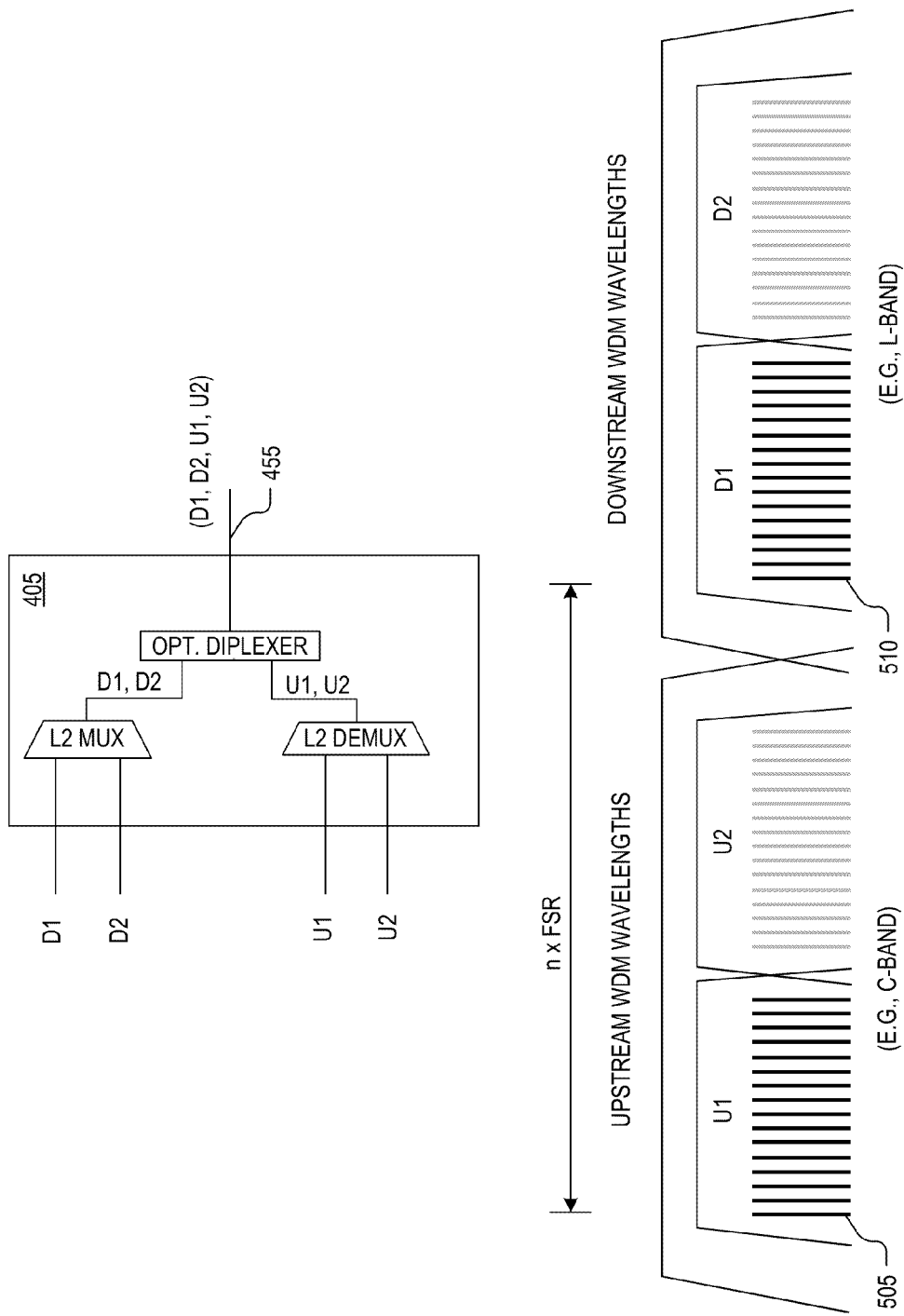
FIG. 5 is a chart illustrating a how the WDM-PON optical spectrum is combined and separated by the multi-port optical filter module, in accordance with an implementation of the disclosure.

In one implementation, each transceiver module 410 integrates an array of laser source 415 and an array of photo-detectors 425 into a single integrated module (e.g., monolithic module or discrete component module). These integrated modules reduce the manufacturing costs of the WDM OLT and simplify the in-field deployment. In one implementation, each transceiver module 410 is a single physical package that includes a photonic integrated circuit ("PIC"). The PIC may include both optical and electrical devices, such as laser diodes, photodiodes, driver circuits, TIAs, phase modulators, arrayed waveguide gratings ("AWG"), etc. In one implementation, L1 MUX 420 and L1 DEMUX 430 are implemented as a passive optical device, such as an AWG. Multiple transceiver modules 410 can link together via multiport optical filter module 405 to provide scalability for expanding the number of WDM CPs serviced. As the number of WDM CPs increases, transceiver modules 410 can be added at the CO to accommodate the increased number of CP subscribers. To facilitate a plug-and-play upgrade, L2 MUX 440 and L2 DEMUX 445 may be M:1 optical multiplexers/demuliplexers (where M is two or greater) used to connect transceiver modules 410 to the PON. Each transceiver module 410 adds additional subscriber downstream wavelengths Dn and upstream wavelengths Un. Referring to FIG. 5, wavelengths Dn and Un are added in sequential adjacent bands of upstream and downstream wavelengths. For example, in FIG. 5 each transceiver module 410 is illustrated as adding a band of 16 upstream wavelengths Un and 16 downstream wavelengths Dn. Of course, transceiver modules 410 may be designed to add more or less wavelengths per band. Furthermore, in one implementation, the upstream and downstream WDM signal set assigned to a given CP 135 are separated by an integer multiple of the FSR of wavelength MUX/DEMUX 160 within hybrid RN 115. For example, if wavelengths 505 and 510 are assigned to a given CP 135, then their spectral separation is n×FSR, where n is a positive integer.

Figure 6:
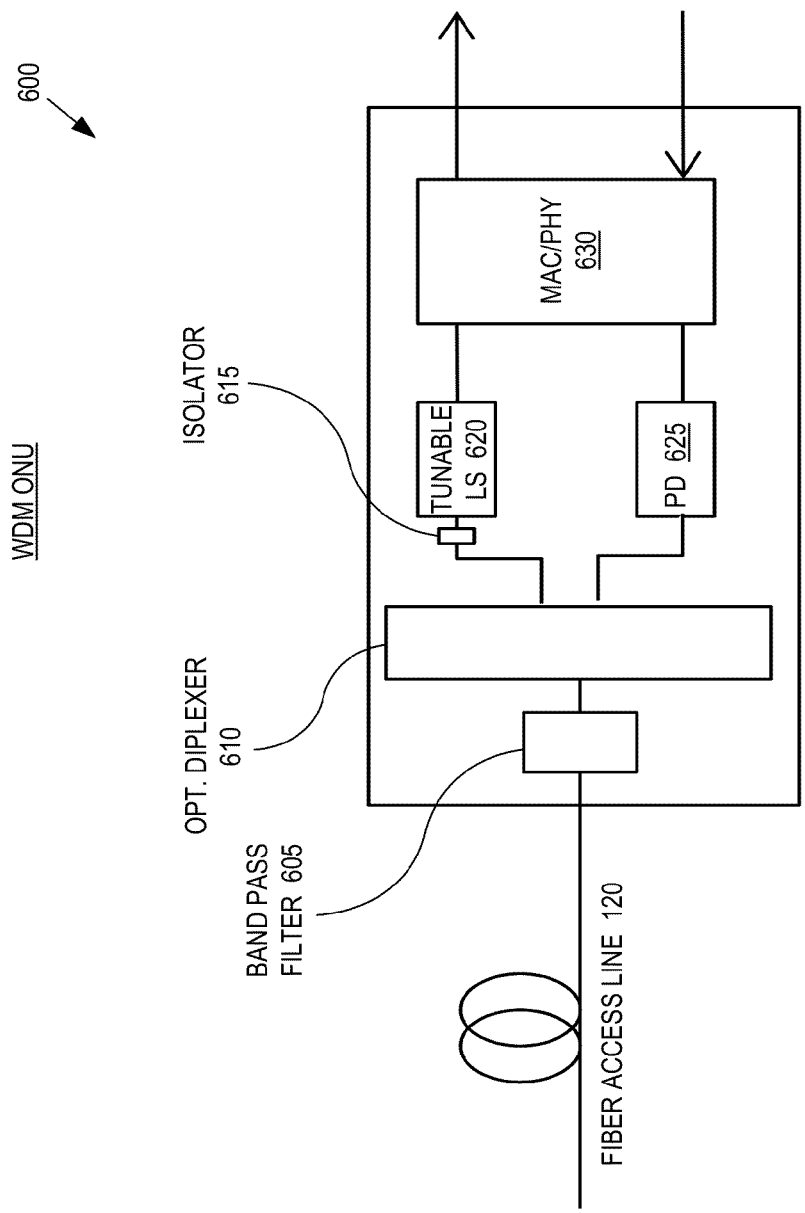
FIG. 6 is a functional block diagram illustrating a WDM ONU of a hybrid PON, in accordance with an implementation of the disclosure.

FIG. 6 is a functional block diagram illustrating a WDM ONU 600, in accordance with an implementation of the disclosure. WDM ONU 600 is one possible implementation of WDM ONUs 130 illustrated in FIG. 1A. The illustrated implementation of WDM ONU 600 includes a band pass filter 605, an optical diplexer 610, an optical isolator 615, a tunable laser source (LS) 620, a broadband photo-detector (PD) 625 (including trans-impedance amplifier), and a MAC/PHY (media access controller and physical interface) 630.

Since each WDM ONU 130 in a WDM sub-PON operates on a different wavelength, it is desirable to have a colorless (i.e., wavelength or color agnostic) ONU. Accordingly, WDM ONU 600 achieves this using tunable LS 620 (e.g., tunable laser diode). During operation, the TDM signal is filter out by band pass filter 605 (e.g., C+L band filter that passes C-band and L-band wavelengths but blocks all other wavelengths including TDM wavelengths and reflects U-band wavelengths). The upstream and downstream WDM signals are separated with optical diplexer 610 so that downstream WDM signals are routed to PD 625 while upstream WDM signals output from tunable LS 620 are routed onto a fiber access line 120. Optical isolator 615 is coupled between optical diplexer 610 and tunable LS 620 to prevent back reflections from interfering with the operation of tunable LS 620. Optical diplexer 610 may be implemented using a cyclic comb filter, a 3-port optical circulator, a 3-db optical power coupler, or otherwise. In one implementation, as described above, optical diplexer 610 is a multi-layer thin film selectively reflective structure.

The processes explained above may be described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A hybrid passive optical network comprising:
a time-division multiplexing optical line terminal delivering communication services to a first group of customer premises via time-division multiplexing signals;
a wavelength-division multiplexing optical line terminal delivering the communication services to a second group of customer premises via wavelength-division multiplexing signals, each customer premise of the second group allocated a portion of the wavelength-division multiplexing signals, each having a different wavelength, the wavelength-division multiplexing optical line terminal comprising:
a first transceiver module comprising:
an array of laser sources generating a first set of downstream wavelength-division multiplexing signals;
an array of photo-detectors;
a first level multiplexer coupled to multiplex the first set of downstream wavelength-division multiplexing signals onto a first optical link; and
a first level de-multiplexer coupled to the array of photo-detectors to de-multiplex a first set of upstream wavelength-division multiplexing signals received on a second optical link; and
a second transceiver module generating a second set of downstream wavelength-division multiplexing signals having different wavelengths than the first set of downstream wavelength-division multiplexing signals and receiving a second set of upstream wavelength-division multiplexing signals;
a multiport optical filter module coupled to combine the first and second sets of downstream wavelength-division multiplexing signals onto a fiber trunk line and to separate the first and second set of upstream wavelength-division multiplexing signals received on the fiber trunk line, the multiport optical filter module comprising:
an optical diplexer coupled to the fiber trunk line;
a second level multiplexer coupled between the optical diplexer and the first and second transceiver modules for multiplexing the first and second set of downstream wavelength-division multiplexing signals; and
a second level de-multiplexer coupled between the optical diplexer and the first and second transceiver modules to demultiplex the first and second set of upstream wavelength-division multiplexing signals; and
a hybrid remote node coupled to the time-division multiplexing and wavelength-division multiplexing optical line terminals via the fiber trunk line and to the customer premises via fiber access lines, the hybrid remote node including a power splitter/combiner and a wavelength multiplexer/de-multiplexer, the power splitter/combiner coupled to the fiber trunk line to power split downstream time-division multiplexing signals onto all of the fiber access lines of both the first and second group of customer premises and the wavelength multiplexer/de-multiplexer coupled to the fiber trunk line to selectively route downstream wavelength-division multiplexing signals to the fiber access lines of just the second group of customer premises based upon the different wavelengths.

2. The hybrid passive optical network of claim 1, further comprising:
a first wavelength selective coupler coupled between the time-division multiplexing and wavelength-division multiplexing optical line terminals and the hybrid remote node such that substantially all optical power of the time-division multiplexing signals is passed to/from the time-division multiplexing optical line terminal while substantially all optical power of the wavelength-division multiplexing signals is passed to/from the wavelength-division multiplexing optical line terminal.

3. The hybrid passive optical network of claim 2, wherein the first wavelength selective coupler comprises:
a first band pass filter function for directing the time-division multiplexing signals to/from the time-division multiplexing optical line terminal;
a high pass filter function for directing a diagnostic wavelength; and
a second band pass filter function positioned spectrally between the first band pass filter function and the high pass filter function for directing the wavelength-division multiplexing signals to/from the wavelength-division multiplexing optical line terminal.

4. The hybrid passive optical network of claim 1, wherein the hybrid remote node further comprises:
a second wavelength selective coupler coupled between the fiber trunk line and the wavelength multiplexer/de-multiplexer and the power splitter/combiner, the second wavelength selective coupler having a wavelength filter that routes the wavelength-division multiplexing signals between the fiber trunk line and the wavelength multiplexer/de-multiplexer and routes the time-division multiplexing signals between the fiber trunk line and the power splitter/combiner; and
third wavelength selective couplers each coupled to a different downstream port of the wavelength multiplexer/ de-multiplexer, a different downstream port of the power splitter/combiner, and a different one of the fiber access lines.

5. The hybrid passive optical network of claim 1, wherein the wavelength multiplexer/de-multiplexer comprises an arrayed waveguide grating.

6. The hybrid passive optical network of claim 5, wherein the wavelength multiplexer/de-multiplexer is wavelength cyclical with a free spectral range and wherein a given downstream wavelength-division multiplexing wavelength and a given upstream wavelength-division multiplexing wavelength allocated to a single customer premise are separated by an integer multiple of the free spectral range.

7. The hybrid passive optical network of claim 1, further comprising a wavelength-division multiplexing optical network unit disposed at a given one of the second group of customer premises, the wavelength-division multiplexing ONU comprising:
 a band pass filter coupled to pass any of the wavelength-division multiplexing signals and to block all of the time-division multiplexing signals;
 a tunable laser source coupled to generate one of the wavelength-division multiplexing signals having a selectable wavelength;
 a photo-detector; and
 a diplexer coupled between the band pass filter and the tunable laser source and the photo-detector, the diplexer coupled to direct any received downstream wavelength-division multiplexing signal to the photo-detector.

8. The hybrid passive optical network of claim 7, wherein the band pass filter comprises a thin film filter.

9. The hybrid passive optical network of claim 7, wherein the diplexer comprises a multi-layer thin film reflective structure.

10. A method of simultaneously providing time division multiplexing and wavelength division multiplexing communication services to customer premises over a passive optical network, the method comprising:
 generating a first group of downstream wavelength-division multiplexing signals with a first laser source array integrated into a first transceiver module;
 generating a second group of downstream wavelength-division multiplexing signals with a second laser source array integrated into a second transceiver module;
 receiving a first group of upstream wavelength-division multiplexing signals with a first photo-detector array integrated into the first transceiver module;
 receiving a second group of upstream wavelength-division multiplexing signals with a second photo-detector array integrated into the second transceiver module;
 multiplexing the first and second groups of downstream wavelength-division multiplexing signals with a first level of optical multiplexer;
 separating multiplexing the first and second groups of upstream wavelength-division multiplexing signals with a first level of optical de-multiplexers;
 diplexing the multiplexed first and second groups of downstream wavelength-division multiplexing signals and the first and second groups of upstream wavelength-division multiplexing signals;
 multiplexing a downstream time-division multiplexing signal with the downstream wavelength-division multiplexing signals onto a fiber trunk line coupled between a central office and a remote node;
 separating the downstream wavelength-division multiplexing signals from the downstream time-division multiplexing signal at the remote node with a wavelength selective filter;
 power splitting the downstream time-division multiplexing signal at the remote node onto a plurality of fiber access lines as split time-division multiplexing signals, wherein the downstream time-division multiplexing signal is power split onto all ports of the remote node facing all of the customer premises; and
 recombining each of the wavelength-division multiplexing signals with a corresponding one of the split time-division multiplexing signals onto a corresponding one of the fiber access lines.

11. The method of claim 10, further comprising:
 multiplexing upstream wavelength-division multiplexing signals received at the remote node on the fiber access lines onto a single link;
 separating an upstream time-division multiplexing signal received on a first one of the fiber access lines from one of the upstream wavelength-division multiplexing signals also received on the first one of the fiber access lines; and
 combining the upstream time-division multiplexing signal with the upstream wavelength-division multiplexing signals onto the fiber trunk link.

12. The method of claim 11, wherein the separating the upstream time-division multiplexing signal and the combining are performed by wavelength selective filters having a band pass filter function for directing the upstream time-division multiplexing signal to a power splitter/combiner and a second filter function for directing the upstream wavelength-division multiplexing signals to a wavelength multiplexer/demultiplexer.

13. The method of claim 12, wherein the upstream and downstream time-division multiplexing signals reside spectrally within the band pass filter function and the upstream and downstream wavelength-division multiplexing signals reside spectrally within the second filter function.

14. The method of claim 12, wherein the wavelength multiplexer/de-multiplexer comprises a cyclical arrayed waveguide having a free spectral range, and wherein the downstream and upstream wavelength-division multiplexing signals allocated to a given customer premise are spectrally separated from each other by an integer multiple of the free spectral range of the wavelength multiplexer/de-multiplexer.

15. The method of claim 11, wherein the upstream wavelength-division multiplexing signals used to communicate with a plurality of the customer premises are spectrally grouped adjacent to each other and the downstream wavelength-division multiplexing signals used to communicate with the plurality of the customer premises are spectrally grouped adjacent to each and are not interspersed with the upstream wavelength-division multiplexing signals.

16. The method of claim 10, wherein multiplexing the downstream time-division multiplexing and wavelength-division multiplexing signals onto the fiber trunk line comprises:
 directing the downstream time-division multiplexing signals with a first band pass filter function; and
 directing the downstream wavelength-division multiplexing signals with a second band pass filter function that is non-overlapping with the first band pass filter function.

17. The method of claim 11, further comprising:
 generating a given upstream wavelength-division multiplexing signal at a given customer premise with a tunable laser source tuned to a wavelength designated for the given customer premise, wherein the tunable laser source is tunable to any wavelength of any of the upstream wavelength-division multiplexing signals.

18. The method of claim 17, further comprising:

diplexing the given upstream wavelength-division multiplexing signal and a given downstream wavelength-division multiplexing signal at the given customer premise with a multi-layer thin film reflective structure to route the given downstream wavelength-division multiplexing signal from a given fiber access line to a photodetector and to route the given upstream wavelength-division multiplexing signal from the tunable laser source to the given fiber access line.

19. The hybrid passive optical network of claim 1, wherein each optical network unit of the customer premises of the first and second groups is coupled to the hybrid remote node via a separate and different one of the fiber access lines.

\* \* \* \* \*